May 5, 1942. P. GLEISSNER 2,281,875
POWER TRANSMITTING MECHANISM
Filed Aug. 18, 1939 6 Sheets-Sheet 1
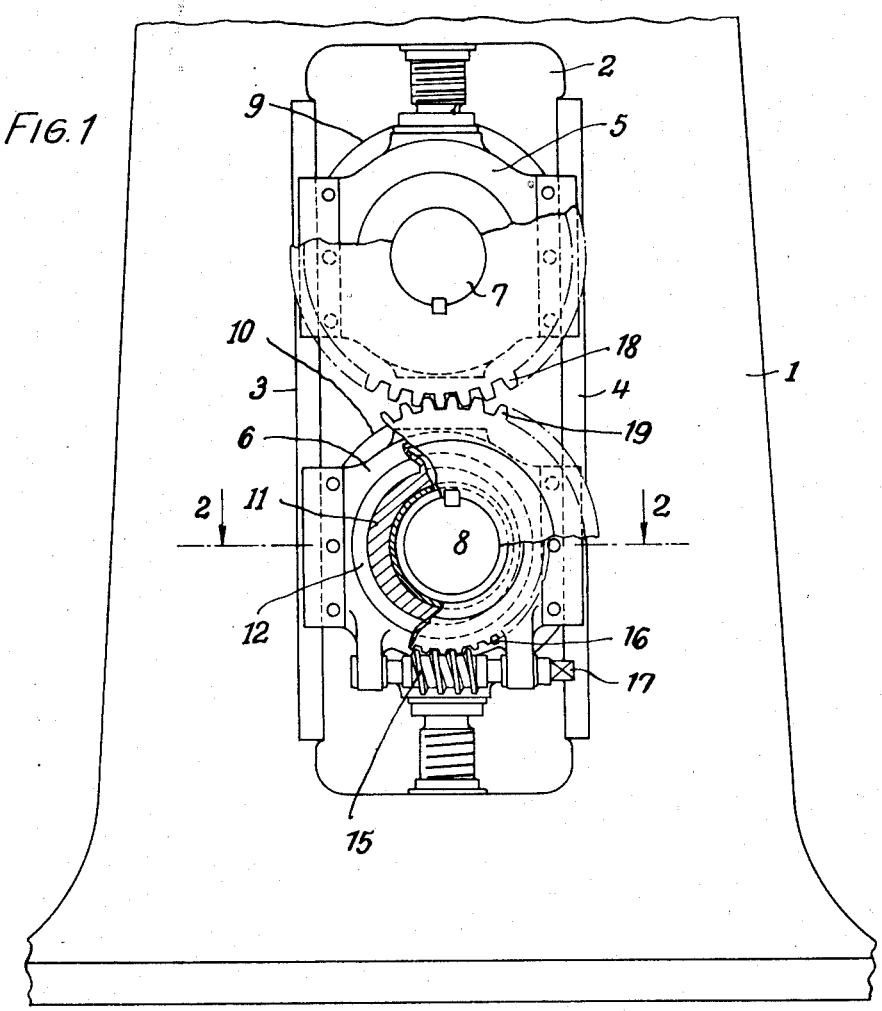
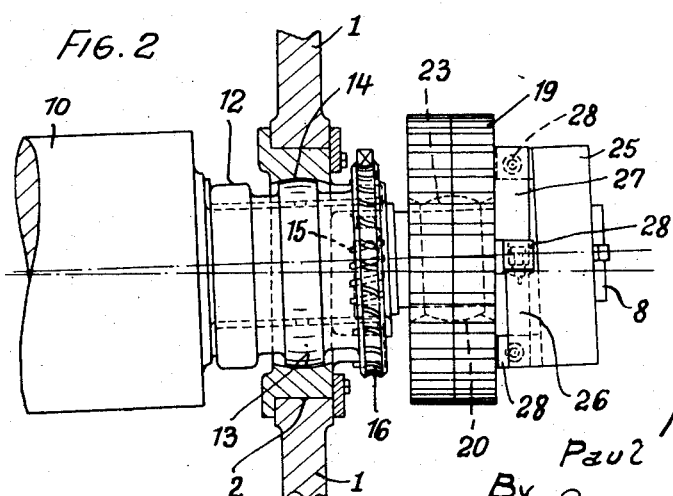
Inventor:
Paul Gleissner May 5, 1942.   P. GLEISSNER   2,281,875
POWER TRANSMITTING MECHANISM
Filed Aug. 18, 1939   6 Sheets-Sheet 2
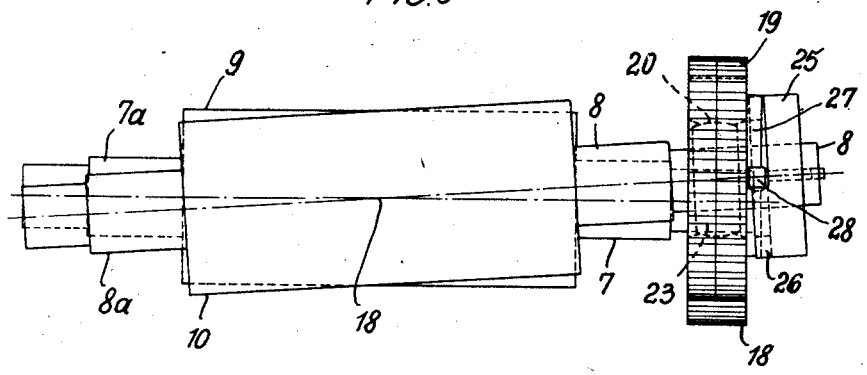
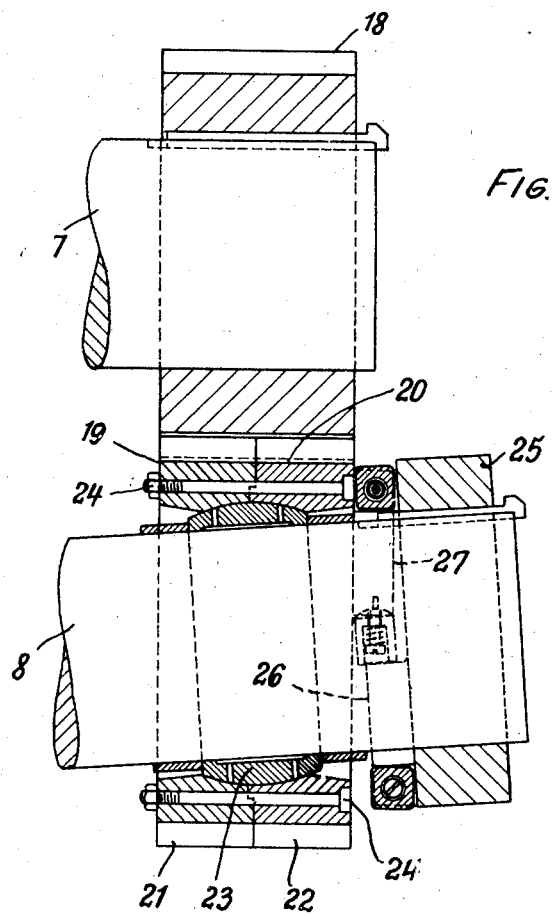
Inventor:
Paul Gleissner
By Young, Emery & Thompson
Attorneys May 5, 1942.　　　　P. GLEISSNER　　　　2,281,875
POWER TRANSMITTING MECHANISM
Filed Aug. 18, 1939　　　6 Sheets-Sheet 3

Inventor:
Paul Gleissner
By
Young, Emery & Thompson
Attorneys

May 5, 1942. P. GLEISSNER 2,281,875
POWER TRANSMITTING MECHANISM
Filed Aug. 18, 1939 6 Sheets-Sheet 4
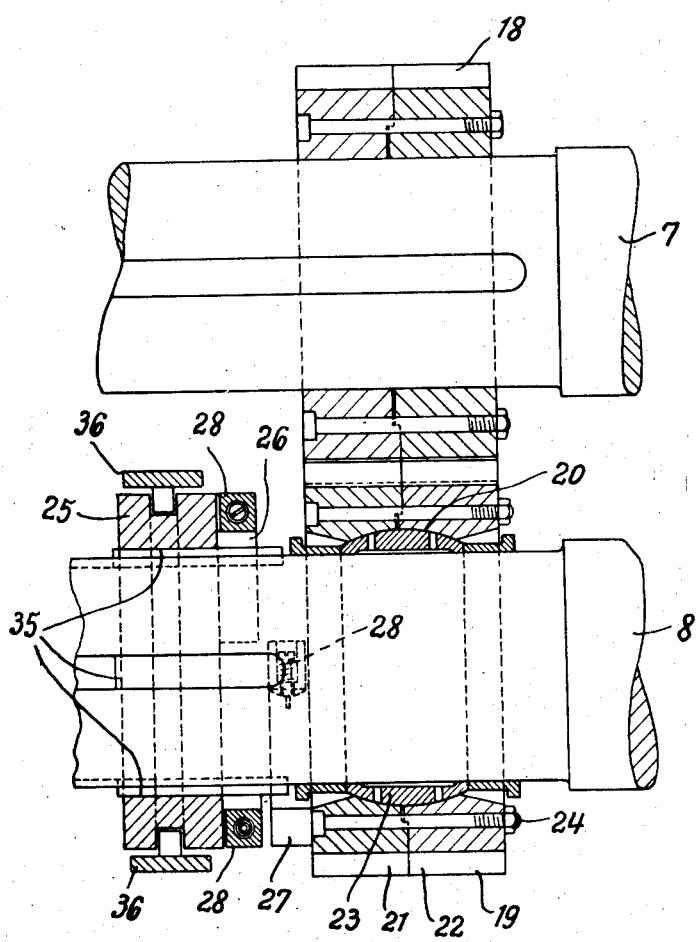
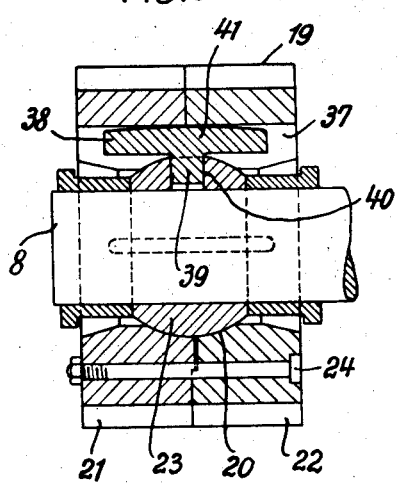
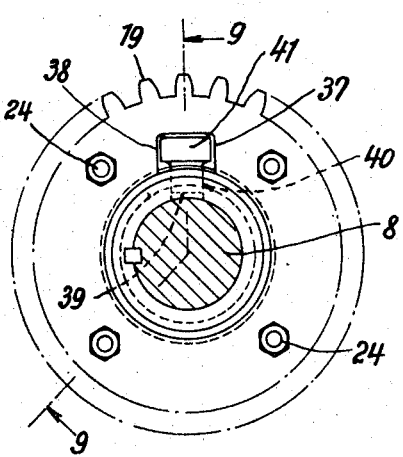
Inventor:
Paul Gleissner
By Young, Emery & Thompson
Attorneys

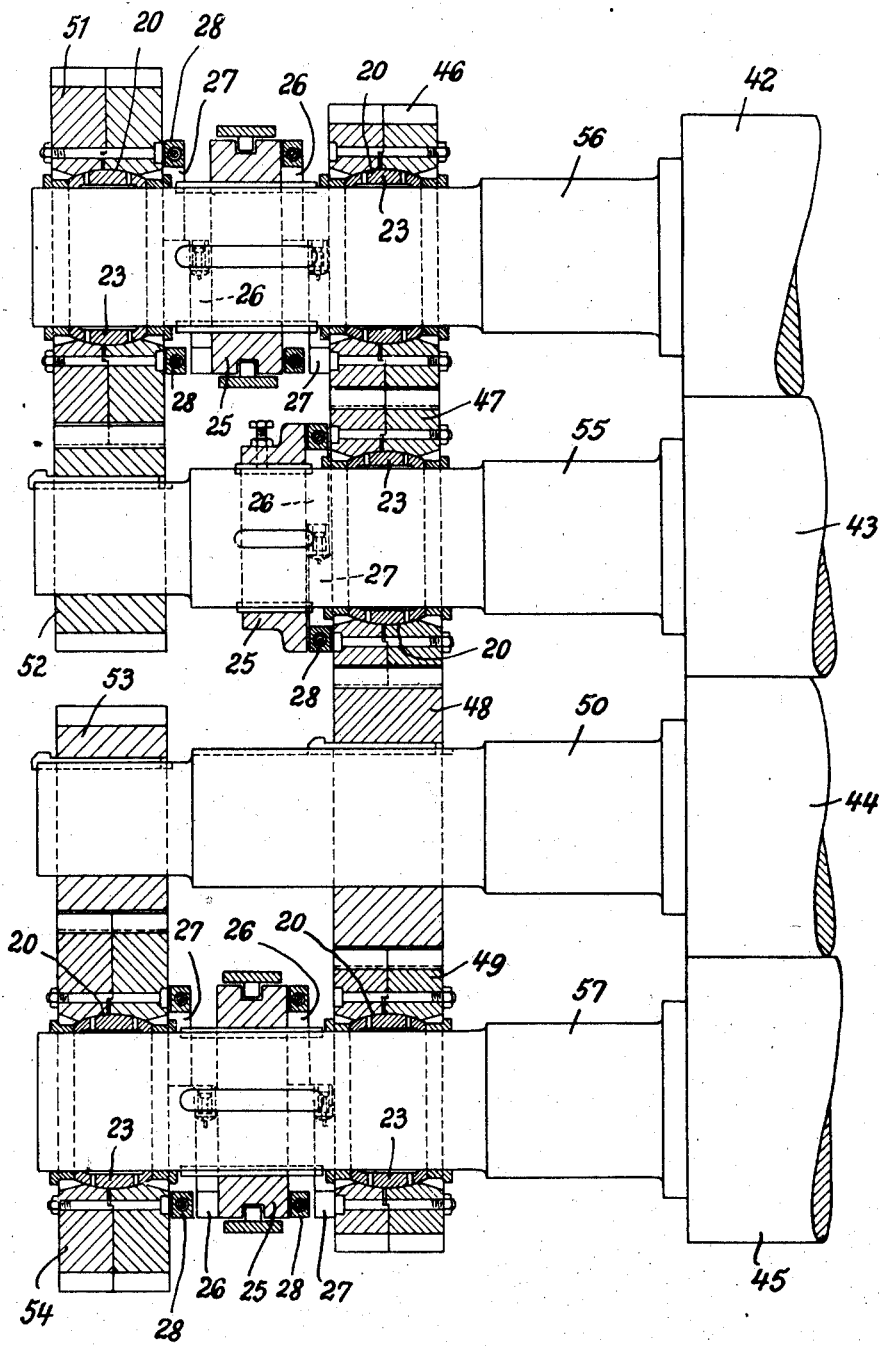

May 5, 1942.　　　P. GLEISSNER　　　2,281,875
POWER TRANSMITTING MECHANISM
Filed Aug. 18, 1939　　　6 Sheets-Sheet 6
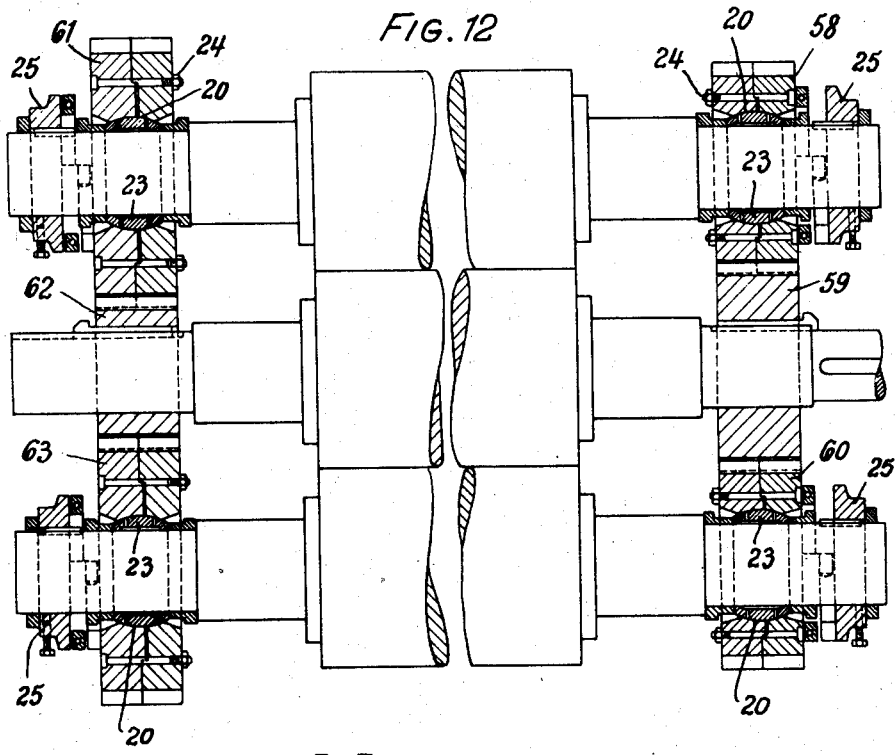
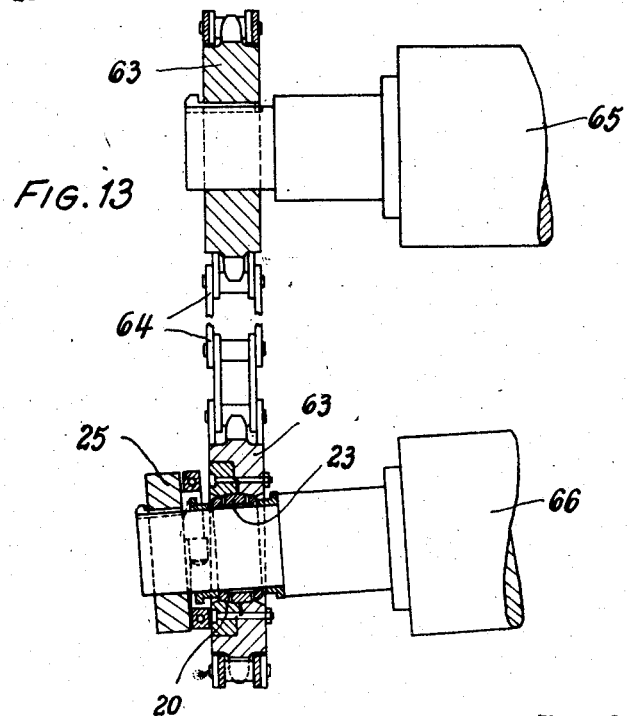
Inventor:
Paul Gleissner
By Young, Emery + Thompson
Attorneys Patented May 5, 1942

2,281,875

UNITED STATES PATENT OFFICE 2,281,875

POWER TRANSMITTING MECHANISM

Paul Gleissner, Dusseldorf-Oberkassel, Germany

Application August 18, 1939, Serial No. 290,885
In Germany March 10, 1938

3 Claims. (Cl. 38—44)

This invention comprises improvements in or relating to power transmitting mechanism and particularly mechanism for transmitting motion between rotating parts out of parallelism with one another.

In calenders, rolling mills and like apparatus comprising rolls located one above another or one beside another it is of advantage, in order to attain uniform thickness of the material to be rolled, to arrange the rolls so that they cross one another. In this connection and for further particulars of advantageous means for effecting the crossing, reference may be directed to the specification accompanying my co-pending patent application Serial No. 215,307 filed June 22, 1938, now Patent No. 2,180,046, November 14, 1939. It may be mentioned here, however, that by such an arrangement it is possible to avoid cambering the rolls while in addition, in the case of textile calenders, a special or improved effect on the material is achieved.

Now, calenders and rolling mills may have two or more rolls and the crossing can be carried out by having one or more of the rolls lying straight in the frame or supports thereof and another roll or rolls crossing the first-mentioned roll or rolls at varying angles. Since, however, for transmitting rotation to the rolls toothed gear wheels are generally fitted on the trunnions of the rolls, with crossing of the rolls adjacent gear wheels would take up an oblique position with respect to one another so that the gear teeth would no longer engage over their whole length but only touch at outside points. As a result, the gear wheels would become worn very quickly so as to be unsuitable for efficient transmission of power.

It will also be realised that in addition to calenders, rolling mills and the like, there are many instances where similar disadvantage in transmitting motion between rotating parts out of parallelism with one another may arise, for example shafts lying at a slight angle to each other, and consequently an important object of the present invention is to provide improved drive transmitting mechanism which will enable disadvantage of this nature to be overcome.

According to this invention power transmitting mechanism and particularly mechanism for transmitting motion between rotating parts out of parallelism with one another comprises a gear wheel constructed for spherical setting or mounting. By this construction the teeth of a toothed gear wheel can bear accurately in the teeth of an opposite wheel entirely irrespective of whether and to what extent rolls may be crossed or inclined to one another. The invention also provides that of any two inter-engaging gear wheels at least one, or if desired both, would have spherical setting. In addition, in order that a spherically set wheel may transmit drive to or from an object, for example a roll, on which it is mounted, it is convenient to transmit the power through a driver or transmitting device which may be of any kind, for instance, a clutch or coupling member non-revolubly disposed on such object. The invention further provides a driver constructed as a disengageable clutch member working towards one or both sides for example for a wheel mounted on a roll-trunnion or for two wheels mounted on a roll trunnion respectively. Moreover, a driver may have projections or dogs constructed with rounded or spherical intermediate members to allow sliding and spherical movements in all directions.

The features above described are of advantageous application to calendering machines constructed according to my aforesaid patent application Serial No. 215,307 as they provide highly advantageous means for accommodating movements of the driving gears due to the use of the revolubly adjustable eccentric bearing sleeves or rings which are used in such machines for adjusting the rollers to positions in which they are inclined in relation to one another. This invention therefore includes, among other things, the combination with calendering machines according to the previous specification of the features hereinbefore described.

In order to enable the invention to be readily understood reference is directed to the accompanying drawings in which:

Figure 1 is an elevational view of an end frame of a calendering machine comprising improvements in accordance with the present invention and embodying features described in the specification accompanying my aforesaid patent application, parts being broken away for purposes of illustration.

Figure 2 is a sectional plan on the line 2—2 of Figure 1.

Figure 3 is a view of a pair of crossed rolls embodying improvements in accordance with this invention.

Figure 4 is a sectional elevation to a larger scale of a modification.

Figure 8 is a sectional elevation of another arrangement in accordance with the invention.

Figure 9 is a sectional elevation of a further form of setting or mounting, the section being along the line 9—9 of Figure 10.

Figure 10 is an end elevation of Figure 9.

Figure 11 is a sectional elevation illustrating another modification.

Figure 12 is a similar view of a further modification, and

Figure 13 is a view of yet another modification.

Figure 5:
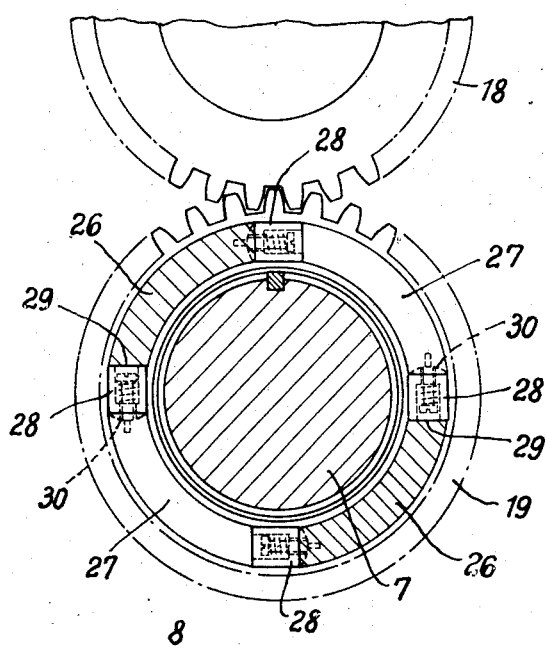
Figure 5 is a sectional elevation of the arrangement shown in Figure 4, the section being on the line 5—5 of Figure 6.

It will be seen that Figure 1 is similar to Figure 2 of the drawings belonging to my patent application, Serial No. 215,307 aforesaid. In the frame 1 there is an opening 2 having lateral guide faces 3 and 4 for vertically movable bearing casings 5 and 6 and the construction at the other end of the machine is similar. The upward and downward movement of the bearing casings 5 and 6 is performed in the conventional manner and does not constitute part of the present invention per se. The trunnions 7 and 8 of the rolls 9 and 10, as well as the trunnions 7ª and 8ª at the other ends of the rolls such as are seen in Figure 3, are all supported in bearing casings such as 5 and 6. The trunnions of the upper roll 9 are disposed in centric bearings in their bearing cases. On the other hand, the sectional portion of Figure 1 shows the trunnion 8 of the lower roll 10 to be located in an eccentric bearing sleeve or ring 11 and there would be a similar though oppositely disposed eccentric bearing sleeve or ring for the trunnion 8ª at the other end of this roll so that by adjustment of the bearing sleeves the roll can be swivelled to desired extent with respect to the other roll about an axis lying midway of the length of the rolls so that the latter cross each other. Obviously, in some cases, the eccentric bearing sleeves or rings may be applied to the upper roll 9 instead of to the lower roll 10. The eccentric bearing sleeves or rings are surrounded by or made integral with the actual bearing sleeves or rings of which one is shown at 12. These actual bearing sleeves have spherical formation as indicated at 13 in Figure 2 for mounting them in a similar internal formation such as 14 of the bearing casings in order that the bearings may accommodate themselves to the swivelling of the roll. Operation of the actual bearing sleeves or rings 12 to effect the swivelling is suitably by worm and worm-wheel such as 15, 16 respectively, the worm wheels as shown being mounted on the actual bearing sleeves and the worms being carried by the bearing casings and being capable of operation by applying a tool to the squared ends of their shafts as at 17. Stops (not shown) may be provided for limiting the adjustment of the actual bearing sleeves or rings 12 as will be understood from my earlier specification aforesaid. The nature of the swivelling of the rollers will be clearly understood from Figure 3 where the swivelling axis is marked 18 in a view which may be considered as showing the rolls in inverted plan.

Figure 6:
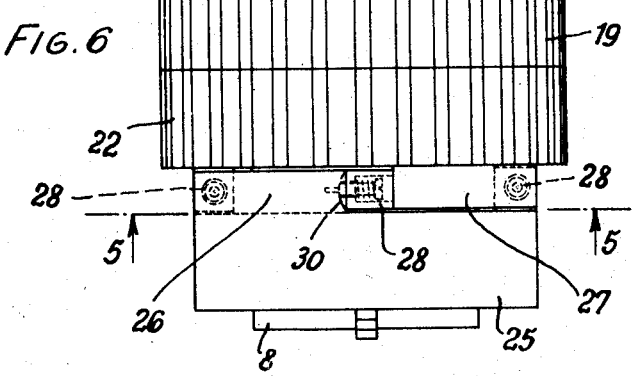
Figure 6 is a plan of the lower part of Figure 5.
Figure 7:
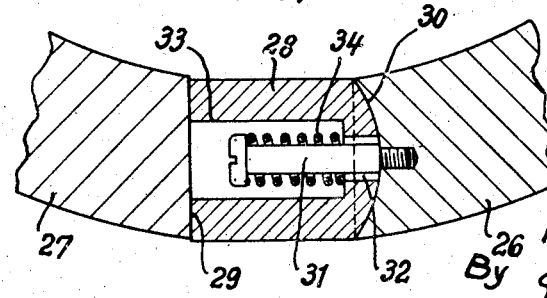
Figure 7 is a fragmentary view to a larger scale of parts seen in Figures 3 to 6.

For the purpose of driving the rolls the adjacent trunnions at each or one end of the rolls are geared together by two toothed wheels such as 18, 19, one of which is keyed rigidly to the trunnion end of the non-swivelling roll as shown. The other gear wheel such as 19, however, is given a spherical setting or mounting in order that it may accommodate itself to the swivelling of the roll 10. To aid in understanding this spherical setting or mounting reference may also be had to Figure 4 because it illustrates the setting and its associated parts in detail, though in other respects the construction in this figure is different as will be described. The gear wheels and trunnion ends are marked 18, 19 and 7, 8 respectively in Figure 4 similarly to other figures and it will be seen that the gear wheel 19 has a spherically formed bore 20 and is divided at right angles to its axis into two parts 21, 22 or into halves so that it may be applied to a correspondingly spherical member or sleeve 23 fixed on the trunnion end 8. The part 23 may have any suitable diameter and by way of illustration is shown larger in Figure 3 than in other figures. On assembling the parts 21, 22 about the spherical member or sleeve 23 they are screwed or held together by screws, bolts or the like as at 24 and when thus assembled it will be realised that the spherical mounting of this gear wheel will allow it to swing or pivot in all directions. The teeth of this gear wheel, therefore, are able to bear accurately over their whole length on the teeth of the opposite gear wheel 18, see Figure 4, so that these wheels are able to co-operate with each other like ordinary gear wheels. In order to transmit the rotary motion of one roll to the other, a driver, such as a collar 25, is keyed on the trunnion-end 8 of the inclined roll 10 say on the outer side of the spherically mounted gear wheel 19. This collar and the gear wheel have pairs of circularly spaced lateral projections or dogs 26, 27 respectively, which engage one with another like the teeth of a dog clutch, see also Figures 5 and 6. Since, however, for the inclined setting of the wheels, the dogs 27 will also be inclined, the several dogs are each provided with a spherically seated part 28 capable of swinging in all directions or universally and having a flat end 29 for bearing on an adjacent dog. Consequently it is never only the edges of the dogs that bear on each other for the driving but always straight surfaces. These parts 28 conveniently constitute end portions of the respective dogs and are secured to the main or body portion resiliently and with suitable play by screws. Thus as shown particularly Figure 7, these end portions and the dogs may have spherically-formed adjacent surfaces at 30 and the former be bored to receive a screw 31 which screws into the body of the dog, the bore fitting with appropriate clearance as at 32 about the shank of the screw and being enlarged as at 33 to form a recess to receive a coil spring 34 abutting at one end against the head of the screw and at the other end against the bottom of the recess. Thus, although the gear wheel 19 may be disaligned with respect to its trunnion end 8 to provide the desired meshing of the gears in crossed conditions of the rolls, efficient power transmission is possible between the rolls because the spherical dog parts 28 can move about spherically while at the same time the dogs 26, 27 can accommodate themselves by relative axial sliding movements at 29 to variations in the setting of the collar 25 and the spherically seated gear wheel 19 with respect to each other due to the crossing of the rolls.

It will also be understood that the spherical setting or mounting of the gear wheels may be applied to parts in different inclined relations from a crossing relation such as is shown in Figure 3. For instance, Figure 4 shows two parts 7 and 8 inclined at an angle towards each other. The parts marked 7 and 8 have been regarded as trunnion ends of rolls for purposes of convenience and may continue to be so regarded in the description following, but it will be apparent that they might equally well be considered as representing, say, the ends of shafts disposed at a slight inclination to each other and requiring to be geared together in the manner stated. In subsequent figures similar references to those already used will be continued to be employed for indicating like parts.

According to the construction shown in Figure 8, the driver or collar 25 may be splined to the part 8 as at 35, instead of being keyed thereto, so as to form a disengageable clutch member. This would be of advantage in cases where change gears are to be provided. The driver or collar can therefore also be constructed as a slidable clutch device and be capable of being shifted say by a clutch fork 36 or otherwise. Furthermore, any other transmission elements may be employed in a similar way and are included within the scope of this invention.

In the example shown in Figures 9 and 10, a spherically mounted wheel 19, suitably of similar construction to that already described, is adapted for power transmission by forming it with an internal longitudinal slot or recess 37 to accommodate a driver member 38, suitably of T-shape, having a shank 39 in the form of a pivot rotatable in a radial hole 40 in the spherical mounting member or sleeve 23 of the wheel and having its head 41 slidable in the longitudinal direction of the axis of the part 8 in the slot or recess 37 of the two-part toothed wheel 19. This driver member 38 is able to follow all the movements of the spherically mounted wheel, and is an advantageous alternative to the driver or collar and clutch or coupling devices 25 already described.

Figure 11 illustrates the application of the invention to a calender with four rolls 42, 43, 44, 45, of which three 42, 43, and 45 can be arranged in crossed position in suitable manner, for instance in the manner described with reference to the roll 10 in Figures 1 and 2. Two gear wheels are shown mounted on each roll trunnion at one end of the rolls. The inner wheels 46, 47, 48 and 49 may serve for driving of the rolls at equal speeds and accordingly may all have the same speed of operation and be of the same size. Of these wheels, the one 48 on the driver roll 44 (which as shown may be the second roll from the bottom, the main drive being derived from the axle of this roll) is a plain toothed wheel and is keyed on the end of the roll trunnion 50. The others, 46, 47 and 49, however, have spherical settings and are suitably of the two-part construction already described. The outer gear wheels 51, 52, 53 and 54 serve for operation of the rolls with frictioning of the material to be rolled, and thus are adapted to drive some of the rolls slower than others. Those 52, 53, say for the two middle rolls 43, 44 are ordinary toothed gears keyed rigidly upon the ends of the roll trunnions 55, 50 whilst those 51, 54, say for the upper and lower rolls 42, 45, are spherically set on the ends of their trunnions 56, 57. Driver devices 25 are placed say on the ends of the two upper and the lower roll trunnions between the pairs of wheels thereon. These driver devices may be of the same nature as those already described and drivers and corresponding gear wheels may comprise similar dog parts to those already described. However, the driver say on the end of the second trunnion 55 from the top is constructed on the one hand as a fixedly mounted member with dogs only on one side, while the other drivers on the other hand are constructed as displaceable or slidable clutch members with dogs and appurtenant parts at each side, so that one or other of the two corresponding gear wheels may be engaged as desired. On the ends of say the upper and lower trunnions 56, 57, the outer wheels 51, 54 may be larger than the inner wheels, the outer wheels 52, 53 on say the ends of the other trunnions 50, 55 being of correspondingly smaller size. Drive from the driver roll 44 for frictioning operation may be through the inner wheels 48, 47 and the fixedly mounted driver 25 of the wheel 47 to the second roll 43 from the top and from the outer wheel 52 of this roll to the outer wheel 51 of the top roll, whilst drive to the lower roll may be through the outer gears 53, 54 of the driver and lower rolls 44, 45 the slidable clutch members 25 of rolls 42, 45 being adjusted accordingly. These clutch members may be adapted to have a middle non-engaged position in which case the gear wheels of both rolls can be out of engagement at the same time as shown if desired.

In applying the invention to a calender with three rolls of which two may be arranged in crossed position in the manner already described, gear wheels for equal speeds and frictioning speeds respectively may be disposed on the ends of the trunnions at respective ends of the rolls as illustrated by Figure 12. In this figure, the equal-speed gears 58, 59 and 60 are again of the same size while the frictioning-speed gears 61, 62 and 63 provide a step-down speed ratio. Assuming the driver roll to be the middle one it might have a fixedly mounted plain gear wheel 59, 62 at respective ends while on the other rolls the gear wheels 58, 61 and 60, 63 would be spherically set, suitably being of the two-part construction already described. The spherically set wheels have associated with them disengageable one-sided dog clutch parts 25 of similar nature to those already described.

Obviously, the arrangements thus described for three and four roll calenders are capable of modification and naturally other arrangements are possible. Similar arrangements can also be employed with calenders with five or more rolls.

The present improvements are also applicable for use in combination with other machines or apparatus comprising rolls, shafts or other rotary objects disposed at variable inclinations to one another and requiring to have drive transmitted to them without disadvantages due to the oblique setting of the rolls or other objects relatively to one another.

According to another modification illustrated by Figure 13, the spherical setting or mounting of gear wheels as above described can be applied to cases in which gear wheels 63 of sprocket or like form are used for chain or like transmission 64 between rotating objects 65, 66 disposed out of parallelism. As will be realised sprocket and like gear wheels can be spherically set or mounted and be adapted to operate through clutch or coupling parts similarly to the toothed gear wheels already described and with like advantages. The invention is also applicable to other types of gear wheel as will be understood and the term "gear wheel" in this specification and in the claims is intended to cover toothed, sprocket and other connectible or intermeshed wheels.

I claim:

1. A calendering or other roller machine comprising a frame, a plurality of rolls mounted in said frame, means for swivelling one of said rolls with its axis oblique to that of another roll, bearings in said frame for the rolls those for the swivel roll being adapted to enable said roll to operate with said axial obliquity, a spherical bearing carried by said swivel roll, a toothed drive gear rotatable on said spherical bearing, a toothed gear on the other roll engaging said toothed drive gear, and clutch means on said swivel roll, said clutch means being adapted to couple said toothed drive gear to the swivel roll with the teeth of said gear in normal parallel engagement with the teeth of the gear on said other roll.

2. A calendering or other roller machine comprising a frame, a plurality of rolls mounted in said frame, means for swivelling one of said rolls with its axis oblique to that of another roll, bearings in said frame for the rolls those for the swivel roll being adapted to enable said roll to operate with said axial obliquity, a spherical bearing carried by said swivel roll, a drive gear rotatable on said spherical bearing, and clutch means on said swivel roll and drive to couple these parts in driving connection, said clutch means including rigid dogs on one of the parts and settable dogs on the other part capable of accommodating themselves to disalignment of the axes of said drive gear and swivel roll.

3. A machine according to claim 2, in which the settable clutch dogs have spherical seatings on the corresponding clutch part and are resiliently connected thereto.

PAUL GLEISSNER.